United States Patent
Sunaga et al.

(10) Patent No.: US 6,868,198 B2
(45) Date of Patent: Mar. 15, 2005

(54) OPTICAL SWITCH FOR SWITCHING BETWEEN MULTIPLE MAIN LIGHT EMITTERS

(75) Inventors: Takahiro Sunaga, Yokohama (JP);
Makoto Katayama, Yokohama (JP);
Tomohiko Kanie, Yokohama (JP);
Masato Furukawa, Yokohama (JP);
Manabu Shiozaki, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 10/331,756

(22) Filed: Dec. 31, 2002

(65) Prior Publication Data

US 2004/0047541 A1 Mar. 11, 2004

Related U.S. Application Data

(60) Provisional application No. 60/411,098, filed on Sep. 17, 2002.

(30) Foreign Application Priority Data

Sep. 10, 2002 (JP) ..................................... P2002-264529

(51) Int. Cl.⁷ .............................. G02B 6/35; H04J 14/02
(52) U.S. Cl. .............................. 385/18; 385/16; 398/50
(58) Field of Search ........................ 385/16–18; 398/45, 398/48, 50

(56) References Cited

U.S. PATENT DOCUMENTS

| | | | |
|---|---|---|---|
| 3,886,544 A | 5/1975 | Narodny | |
| 4,498,730 A | 2/1985 | Tanaka et al. | |
| 5,163,112 A | 11/1992 | Lefevre et al. | |
| 5,742,712 A | 4/1998 | Pan et al. | |
| 5,838,847 A | 11/1998 | Pan et al. | |
| 5,903,687 A | 5/1999 | Young et al. | |
| 5,974,207 A * | 10/1999 | Aksyuk et al. | 385/24 |
| 6,031,946 A | 2/2000 | Bergmann et al. | |
| 6,049,641 A * | 4/2000 | Deacon et al. | 385/15 |
| 6,198,856 B1 * | 3/2001 | Schroeder et al. | 385/17 |
| 6,324,318 B1 * | 11/2001 | Suzuki | 385/24 |
| 6,325,553 B1 * | 12/2001 | Deacon et al. | 385/89 |
| 6,363,183 B1 * | 3/2002 | Koh | 385/19 |
| 6,483,962 B1 | 11/2002 | Novotny | |
| 2002/0071627 A1 | 6/2002 | Smith et al. | |
| 2002/0146199 A1 | 10/2002 | Zhang | |
| 2002/0181876 A1 * | 12/2002 | Chang | 385/47 |

FOREIGN PATENT DOCUMENTS

JP 2002-135817 5/2002

* cited by examiner

Primary Examiner—John D. Lee
(74) Attorney, Agent, or Firm—McDermott Will & Emery LLP

(57) ABSTRACT

There is disclosed an optical switch for switching between a plurality of main light emitters respectively emitting light components having wavelengths different from each other and a backup light emitter adapted to replace any of the main light emitters, a light emitter switching method for switching from one failed main light emitter to a backup light emitter by using the optical switch the above switch and a light receiver switching method for switching from one failed main light receiver to a backup light receiver by using the above.

25 Claims, 9 Drawing Sheets

OPTICAL SWITCH FOR SWITCHING BETWEEN MULTIPLE MAIN LIGHT EMITTERS

CROSS-REFERENCE TO RELATED APPLICATION

This application claims priority to Provisional Application Ser. No. 60/411,098 filed on Sep. 17, 2002, which is/are hereby incorporated by reference in its/their entirety.

BACKGROUND OF THE INVENTION

1. Field of the Invention

The present invention relates to an optical switch, a light emitter switching method, a light receiver switching method, a multiplexer, a demultiplexer, and an optical communication system which are used in optical communications and the like.

2. Related Background Art

FIG. 1 shows a typical configuration of a protection system 90 on the demultiplexer side in an optical communication technique. As depicted, the protection system 90 has a configuration in which 2×1 type switches 92 are respectively provided for eight waves of a WDM signal demultiplexed by a demultiplexer 91, whereas 4×1 type switches 93 are disposed at their corresponding output ports. These switches 92, 93 switch from main lines 94 to backup system lines 95. A similar technique is also disclosed in Japanese Patent Application Laid-Open No. 2002-135817

From the viewpoint of optical signals transmitted to the backup system lines 95 in the conventional configuration shown in FIG. 1, two switches 92, 93 are inserted in series, whereby the above-mentioned switching cannot be carried out normally if any of the switches fails. Therefore, the failure probability becomes higher than that in the case where only one switch is inserted.

Also, since the two switches 92, 93 are arranged in series, the number of junctions on transmission lines increases, which enhances transmission loss.

Further, it is difficult for the apparatus to reduce its overall size since the switches 92, 93, which are separate components, are combined together.

SUMMARY OF THE INVENTION

In order to overcome the problem mentioned above, it is an object of the present invention to provide an optical switch, a light emitter switching method, a light receiver switching method, a multiplexer, a demultiplexer, and an optical communication system which can lower the failure probability, reduce the transmission loss, and decreases the size.

It is one aspect of the present invention to provide an optical switch in accordance with the present invention is, as defined in claim 1, an optical switch for switching between a plurality of main light emitters respectively emitting light components having wavelengths different from each other and a backup light emitter adapted to replace any of the main light emitters, a base member formed with a plurality of main waveguides for respectively inputting main light components from the main light emitters and guiding the main light components to a multiplexer; and a backup waveguide, disposed so as to intersect the main waveguides obliquely, for introducing a backup light component from the backup light emitter from the downstream side to upstream side in the advancing direction of the main light components; a plurality of mirrors, disposed so as to be insertable into and retractable from respective intersections between the backup waveguide and the main waveguides, for blocking the main light components from the main light emitters and reflecting the backup light component from the backup light emitter toward the multiplexer when inserted; and a plurality of driving sections for the respective mirrors for inserting the mirrors into and retracting the mirrors from the intersections.

In above optical switch, a base member is provided with not only a plurality of main waveguides for respectively inputting main light components from main light emitters and guiding the main light components to a multiplexer, but also a backup waveguide disposed so as to intersect the main waveguides obliquely. On this backup waveguide, a backup light component from a backup light emitter is made incident from the downstream side to upstream side in the advancing direction of main light components.

Mirrors are provided at the respective intersections between the backup waveguide and the main waveguides so as to be insertable into and retractable from the intersections, and block the main light components from the main light emitters and reflect the backup light component from the backup light emitter toward the multiplexer when inserted. The optical switch is also provided with respective driving sections for the mirrors for inserting the mirrors into and retracting the mirrors from the intersections.

When one main light emitter fails in the configuration mentioned above, a driving section inserts a mirror into the intersection on a main waveguide corresponding to the one main light emitter, while a backup light emitter whose optical output characteristic is adjusted so as to replace the one main light emitter is caused to emit a backup light component, whereby the backup light component is reflected by the mirror, so as to be guided to the main waveguide corresponding to the one main light emitter. As a consequence, the failed main light emitter can be replaced by the backup light emitter. Thus, instead of the conventional combination of a plurality of switches, a single switch can switch from main light emitters to a backup light emitter, whereby the failure probability can be made lower than the conventional one, so as to reduce the transmission loss, and the size can be decreased.

It is another feature of the present invention that the optical switch is configured such that the base member is further formed with a verification waveguide for guiding the backup light component from the backup light emitter to a verification light receiver for verifying the backup light emitter when all the mirrors are retracted from the intersections.

In this case, in a state where all the mirrors are retracted from the intersections, a backup light component from the backup light emitter can be guided to the verification light receiver by way of the verification waveguide, whereby the verification light receiver can receive the backup light component, so as to verify the backup light emitter, thus making it possible to improve the reliability of backup functions.

It is another aspect of the present invention to provide an optical switch for switching between a plurality of main light receivers respectively receiving light components having wavelengths different from each other and a backup light receiver adapted to replace any of the main light receivers; and comprises a base member formed with a plurality of main waveguides for respectively inputting demultiplexed light components demultiplexed by a demultiplexer directed to the main light receivers and guiding the demultiplexed light components to the main light receivers; and a backup waveguide, disposed so as to intersect the main waveguides obliquely, extending from the downstream side to upstream side in the advancing direction of the demultiplexed light components so as to terminate at the backup light receiver; a plurality of mirrors, disposed so as to be insertable into and retractable from respective intersections between the backup waveguide and the main waveguides, for reflecting the demultiplexed lights component from the demultiplexer toward the backup light receiver when inserted; and a plurality of driving sections for the respective mirrors for inserting the mirrors into and retracting the mirrors from the intersections.

In the above optical switch, a base member is provided with not only a plurality of main waveguides for respectively inputting demultiplexed light components to the main light receivers and guiding the demultiplexed light components to the main light receivers, but also a backup waveguide disposed so as to intersect the main waveguides obliquely. This backup waveguide is formed so as to extend from the downstream side to upstream side in the advancing direction of the demultiplexed light components and terminate at the backup light receiver.

Mirrors are provided at the respective intersections between the backup waveguide and the main waveguides so as to be insertable into and retractable from the intersections, and reflect demultiplexed light components from the demultiplexer toward the backup light receiver. The optical switch is also provided with respective driving sections for the mirrors for inserting the mirrors into and retracting the mirrors from the intersections.

When one main light receiver fails in the above-mentioned configuration, a driving section inserts a mirror into the intersection on a main waveguide corresponding to the one main light receiver, whereby a demultiplexed light component corresponding to the one main light receiver is reflected by the mirror, so as to be guided to the backup waveguide and received by the backup light receiver. As a consequence, the failed main light receiver can be replaced by the backup light receiver. Thus, instead of the conventional combination of a plurality of switches, a single switch can switch from main light receivers to a backup light receiver, whereby the failure probability can be made lower than the conventional one, so as to reduce the transmission loss, and the size can be decreased.

It is another feature of the present invention that the optical switch is configured such that the base member is further formed with a verification waveguide for guiding a light component from a verification light emitter for verifying the backup light receiver into the backup light receiver when all the mirrors are retracted from the intersections.

In this case, in a state where all the mirrors are retracted from the intersections, the light component from the verification light emitter can be guided to the backup light receiver byway of the verification waveguide, whereby the backup light receiver can be verified according to data of light received by the backup light receiver, thus making it possible to improve the reliability of backup functions.

Preferably, it is another feature of the present invention that the driving section in each of the optical switch used on the multiplexer side and the optical switch used on the demultiplexer side includes a cantilever disposed on an upper face of the base member, and a first comb electrode formed on a predetermined surface of the cantilever at a predetermined position, the mirror being placed at a predetermined position of the cantilever near a free end thereof such that the mirror is inserted into or retracted from the intersection; a second comb electrode, placed on the upper face of the base member so as to oppose the first comb electrode, having teeth alternately inserted between teeth of the first comb electrode; and electrostatic force generating means for generating an electrostatic force between the first and second comb electrodes by applying a predetermined voltage between the first and second comb electrodes; the electrostatic force generating means generating the electrostatic force so as to drive the first comb electrode toward or away from the second comb electrode, thereby inserting the mirror into or retracting the mirror from the intersection.

In this case, when an electrostatic force (attractive force or repulsive force) is applied between the first and second comb electrodes by applying a predetermined voltage between the first and second comb electrodes with the electrostatic force generating means, the cantilever flexes, so that the mirror is switchable between a state where the mirror placed near the free end of the cantilever is inserted in the intersection and the state where the mirror is retracted from the intersection. When the driving section is configured as such, the space can be saved in the mirror moving direction (i.e., a direction orthogonal to the cantilever extending direction), whereby a small-sized, highly-integrated optical switch can be realized.

It is another aspect of the present invention to provide a light emitter switching method for switching from one failed main light emitter to a backup light emitter by using the optical switch of the present invention; and comprises an adjusting step of adjusting an optical output characteristic of the backup light emitter such that the backup light emitter replaces the one main light emitter; a backup light emitting step of emitting a backup light component from the backup light emitter adjusted in the adjusting step; a verifying step of receiving the backup light component with the verification light receiver and verifying whether the backup light emitter is adjusted normally or not according to data of thus received light; and a mirror inserting step of causing the driving section to insert a mirror into the intersection between the main waveguide corresponding to the one main light emitter and the backup waveguide when a result verifying that the backup light emitter is adjusted normally is obtained.

Namely, the optical output characteristic of the backup light emitter is adjusted such that the backup light emitter replaces the failed main light emitter in the adjusting step, and the backup light component is emitted from thus adjusted backup light emitter in the backup light emitting step. In the verifying step, the backup light receiver receives the backup light component, and verifies whether the backup light emitter is adjusted normally or not according to data of thus received light. If a result verifying that the backup light emitter is adjusted normally is obtained here, a driving section inserts a mirror into the intersection between the main waveguide corresponding to the one main light emitter and the backup waveguide in the mirror inserting step. As a consequence, the backup light component is reflected by the mirror, so as to be guided to the main waveguide corresponding to the one main light emitter. Thus, the backup light emitter having yielded a result verifying that it is normally adjusted can replace the failed main light emitter, whereby the reliability of backup functions can be improved.

It is another aspect of the present invention to provide a light receiver switching method for switching from one failed main light receiver to a backup light receiver by using the optical switch according to the present invention; and comprises a verification light receiving step of emitting a verification light component from the verification light emitter toward the backup light receiver and receiving the verification light component with the backup light receiver; a verifying step of verifying whether the backup light receiver operates normally or not according to data of verification light received by the backup light receiver; and a mirror inserting step of causing the driving section to insert a mirror into the intersection between the main waveguide corresponding to the one main light receiver and the backup waveguide when a result verifying that the backup light receiver operates normally is obtained.

Namely, a verification light component is emitted from the verification light emitter toward the backup light receiver in the verification light receiving step, and it is verified whether the backup light receiver operates normally or not according to data of light received by the backup light receiver in the verifying step. If a result verifying that the backup light receiver operates normally is obtained here, a driving section inserts a mirror into the intersection between the main waveguide corresponding to the one main light receiver and the backup waveguide in the mirror inserting step. As a consequence, a demultiplexed light component corresponding to the one main light receiver is reflected by the mirror, so as to be guided to the backup waveguide and received by the backup light receiver. Thus, the backup light receiver having yielded a result verifying that it operates normally can replace the failed main light receiver, whereby the reliability of backup functions can be improved.

The optical switch according to the present invention may be incorporated in a multiplexer. Namely, a multiplexer of the present invention comprising the optical switch according to the present invention can be constructed.

The optical switch according to the present invention may be incorporated in a demultiplexer. Namely, a demultiplexer of the present invention comprising the optical switch according to the present invention can be constructed.

It is further aspect of the present invention to provide an optical communication system including the multiplexer and demultiplexer sides comprising the optical switch according to one of claims 1 to 5 can be constructed.

The present invention will be more fully understood from the detailed description given hereinbelow and the accompanying drawings, which are given byway of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

BRIEF DESCRIPTION OF THE DRAWINGS

FIGS. 5A and 5B show views showing the arrangement of a mirror, wherein FIGS. 5A and 5B show respective states where the mirror is retracted from and inserted in an intersection.

FIGS. 8A, 8B and 8C show Diagrams for explaining an operation of the optical switch on the multiplexer side, wherein FIGS. 8A, 8B and 8C illustrate a state immediately after one light emitter fails, a verifying step for a backup light emitter, and a mirror inserting step, respectively.

FIGS. 10A, 10B and 10C show diagrams for explaining an operation of the optical switch on the demultiplexer side, wherein FIGS. 10A, 10B and 10C illustrate a state immediately after one light receiver fails, a verifying step for a backup light receiver, and a mirror inserting step, respectively.

DETAILED DESCRIPTION OF THE PREFERRED EMBODIMENTS

In the following, preferred embodiments of the optical switch, light emitter switching method, light receiver switching method, and optical communication system in accordance with the present invention will be explained with reference to the drawings.

[Configuration of Optical Communication System]

Figure 1:
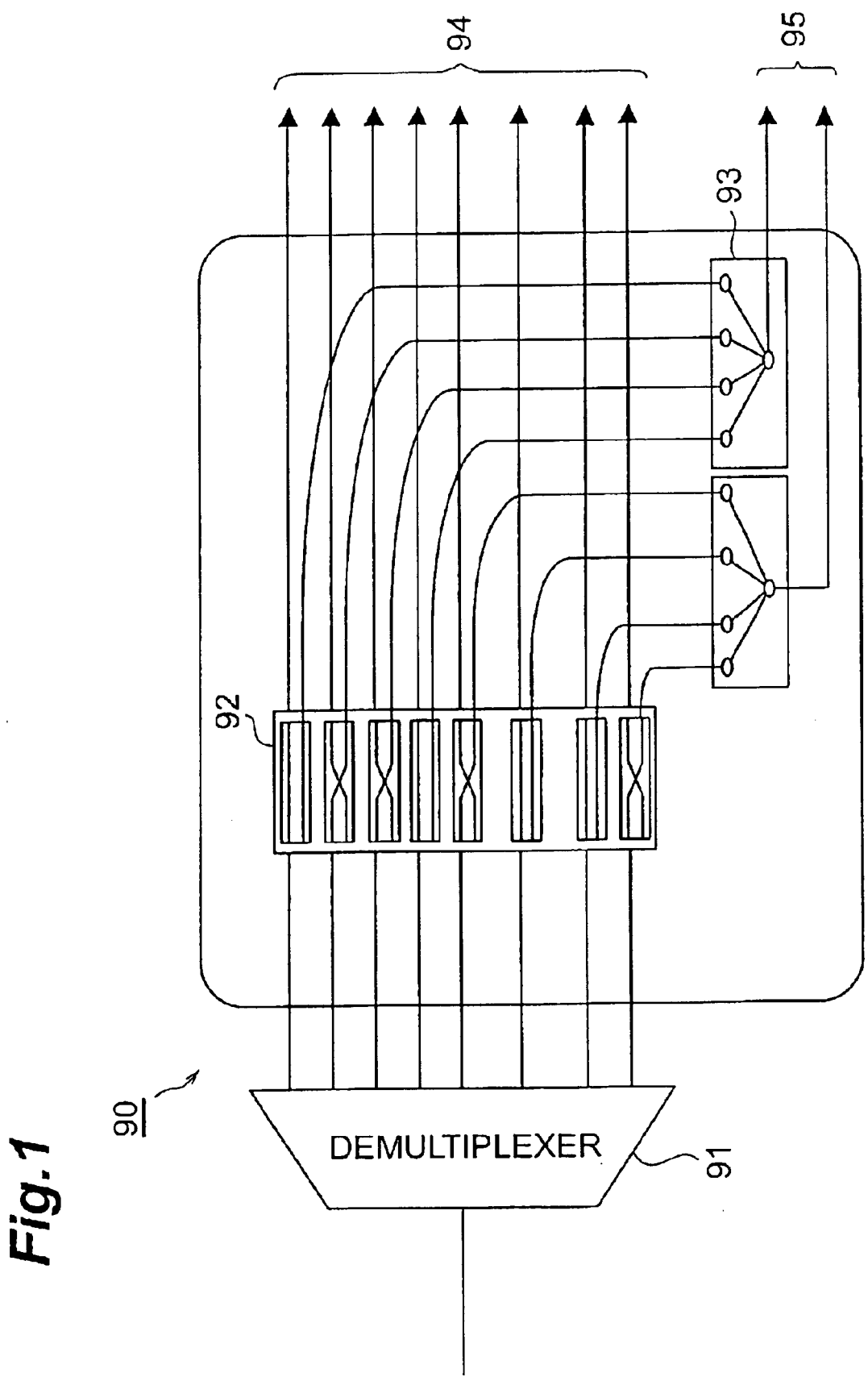
FIG. 1 shows a diagram of a protection system on the demultiplexer side in a conventional optical communication technique.
Figure 2:
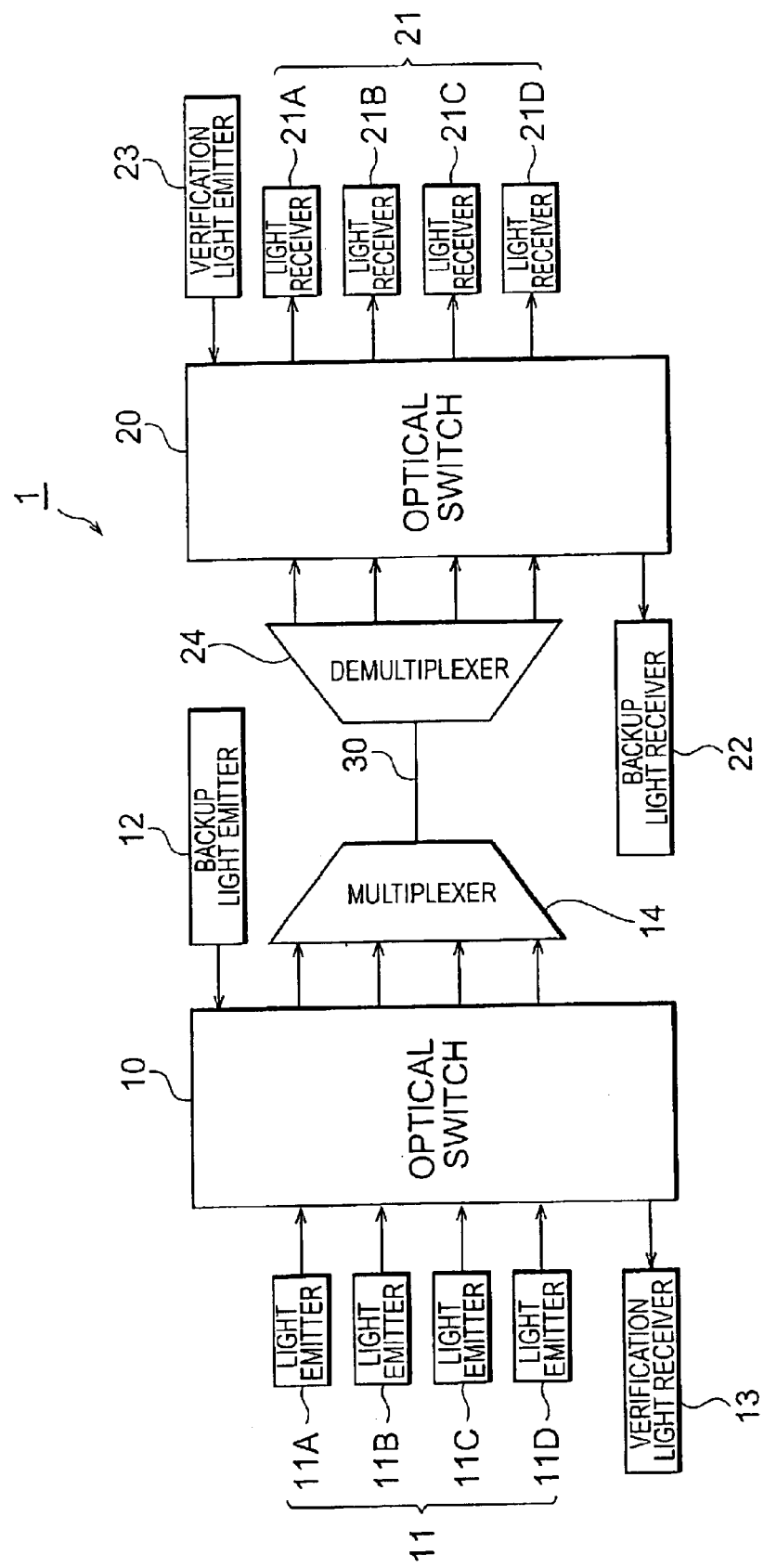
FIG. 2 shows a diagram of the optical communication system in accordance with an embodiment of the present invention.

FIG. 2 shows an overall diagram of an optical communication system 1. As shown in this drawing, the optical communication system 1 is provided with a multiplexer 14 and a demultiplexer 24 which are connected to each other by way of a main line 30. Disposed on the multiplexer 14 side of the optical communication system 1 are four light emitters 11A, 11B, 11C, 11D (collectively referred to as light emitters 11), a backup light emitter 12 for backing up the light emitters 11, an optical switch 10, and a verification light receiver 13. The four signal light components from the light emitters 11 are multiplexed by the multiplexer 14 by way of the optical switch 10, and thus multiplexed light is transmitted toward the demultiplexer 24 by way of the main line 30. Similarly disposed on the demultiplexer 24 side are four light receivers 21A, 21B, 21C, 21D (collectively referred to as light receivers 21), a backup light receiver 22 for backing up the light receivers 21, an optical switch 20, and a verification light emitter 23. The four signal light components demultiplexed by the demultiplexer 24 are transmitted to their corresponding light receivers 21 by way of the optical switch 20.

[Configuration of Optical Switch 10 on Multiplexer 14 Side]

Figure 3:
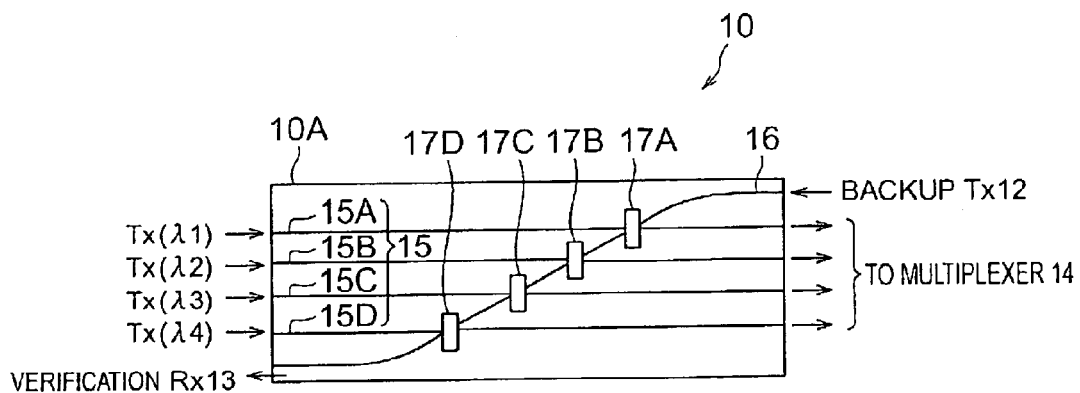
FIG. 3 shows a diagram of an optical switch on the multiplexer side.

FIG. 3 shows a diagram of the optical switch 10 on the multiplexer 14 side. As shown in this drawing, the optical switch 10 is provided with a planar waveguide 10A, whereas the planar waveguide 10A is provided with four parallel main waveguides 15A, 15B, 15C, 15D for inputting the respective signal light components from the light emitters 11 and guiding the signal light components to the multiplexer 14; and a backup waveguide 16, disposed so as to intersect the main waveguides 15 obliquely, for guiding a backup light component from the backup light emitter 12 to the verification light receiver 13. In FIG. 3, light emitters and light receivers are referred to as Tx and Rx (as in FIGS. 4, 8, and 10 which will be explained later), respectively. Also, the light emitters 11A, 11B, 11C, and 11D outputting signal light components having wavelengths $\lambda 1, \lambda 2, \lambda 3$, and $\lambda 4$ are referred to as Tx($\lambda 1$), Tx($\lambda 2$), Tx($\lambda 3$), and Tx($\lambda 4$), respectively (as in FIGS. 8A, 8B and 8C which will be explained later).

In this planar waveguide 10A, mirrors 17A, 17B, 17C, 17D are disposed at intersections between the backup waveguide 16 and individual main waveguides 15, respectively, so as to be insertable therein and retractable therefrom.

Figure 5A:
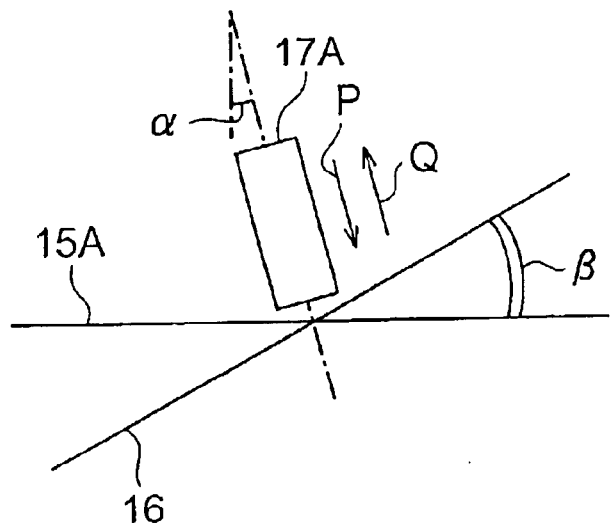
Figure 5B:
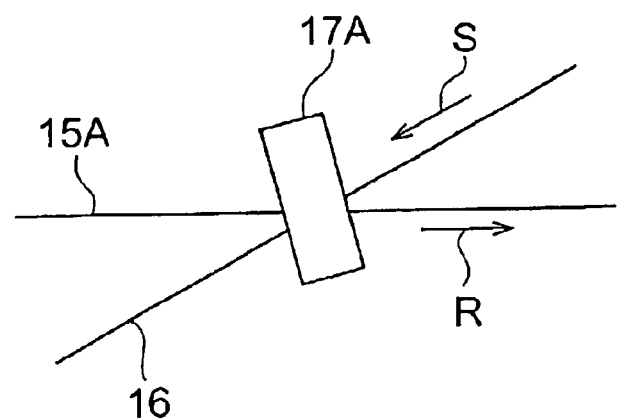

The arrangement of the mirror 17A will be explained with reference to FIGS. 5A, 5B and 5C. As shown in FIG. 5A, the mirror 17A is disposed so as to be tilted by a predetermined angle α with respect to a plane orthogonal to the optical axis of signal light along the main waveguide 15A. The mirror 17A is inserted into the intersection along the direction of arrow P, so as to attain the inserted state of FIG. 5B. On the other hand, the mirror 17A is retracted from the intersection along the direction of arrow Q, so as to attain the retracted state of FIG. 5A. The above-mentioned predetermined angle α is set to a half of the angle β formed between the main waveguide 15A and backup waveguide 16. Therefore, in the state inserted in the intersection as shown in FIG. 5B, the mirror 17A blocks the signal light component from the light emitter 11A and reflects the backup light component from the backup light emitter 12 (arriving from the direction of arrow S) toward the multiplexer 14 in the direction of arrow R. The mirrors 17B, 17C, 17D are disposed at their corresponding intersections as with the mirror 17A.

Figure 6:
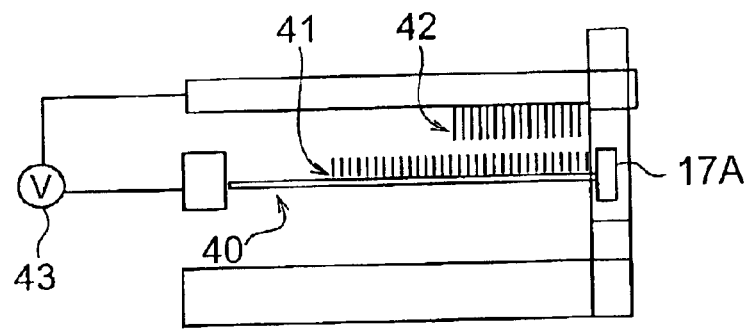
FIG. 6 show a plan view showing the driving section of the mirror.

The optical switch 10 is also provided with a driving section 60 (see FIGS. 6 and 7) for inserting each mirror into its corresponding intersection and retracting it therefrom. Here, the driving section 60 will be explained. FIG. 6 is a plan view showing the driving section 60 of mirror, whereas FIG. 7 is a side view thereof.

Figure 7:
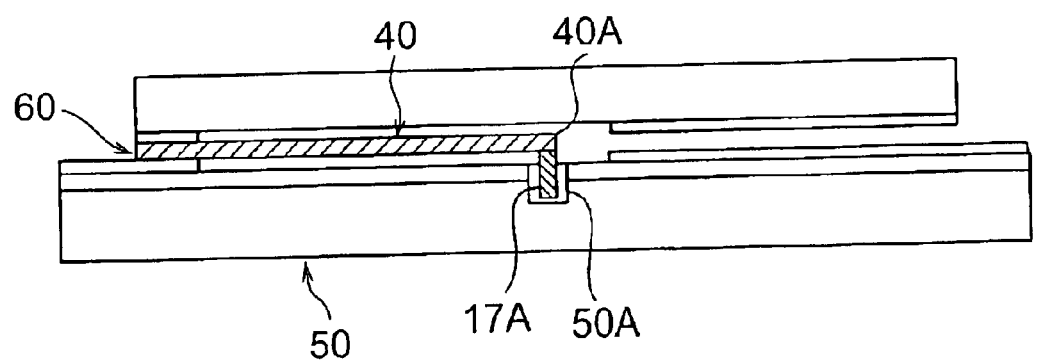
FIG. 7 show a side view showing the driving section of the mirror.

As shown in FIG. 7, the driving section 60 formed by use of a microelectromechanical system (MEMS) technology is disposed on a planar waveguide 50, and has the following configuration of actuator structure. Namely, a cantilever 40 is secured to the planar waveguide 50, and has a free end 40A positioned above a groove 50A. The mirror 17A is secured to the lower face of the free end 40A and is inserted in the groove 50A, so as to be switchable between the above-mentioned states inserted in the intersection and retracted therefrom in the planar waveguide 10A.

As shown in FIG. 6, one side face of the cantilever 40 is formed with a comb electrode 41, whereas a comb electrode 42 equipped with teeth alternately inserted between the teeth of the comb electrode 41 is placed on the upper face of the planar waveguide 50 at the position opposing the comb electrode 41. The cantilever 40 and the comb electrode 42 are electrically connected to each other by way of a voltage source 43. When the voltage source 43 applies a predetermined voltage between the comb electrode 41 of the cantilever 40 and the comb electrode 42, an electrostatic force is generated therebetween. Due to this electrostatic force, the cantilever 40 is attracted to the comb electrode 42.

When static electricity is used as such, the cantilever 40 can be driven with a small power consumption. Further, since each of the comb electrode 41 of the cantilever 40 and the comb electrode 42 is provided with a plurality of teeth, a large electrostatic force can be generated even by a low application voltage. Namely, an electrostatic force is generated, so as to drive the comb electrode 41 toward or away from the comb electrode 42, whereby the mirror 17A fixed at an end part of the cantilever 40 can be driven so as to be inserted into or retracted from the intersection.

Constructing the driving section 60 as mentioned above is effective in that the space can be saved in the mirror moving direction (i.e., a direction orthogonal to the cantilever extending direction), whereby a small-sized, highly-integrated optical switch can be realized.

[Configuration of Optical Switch 20 on Demultiplexer 24 Side]

The configuration of the optical switch 20 on the demultiplexer 24 side will now be explained.

Figure 4:
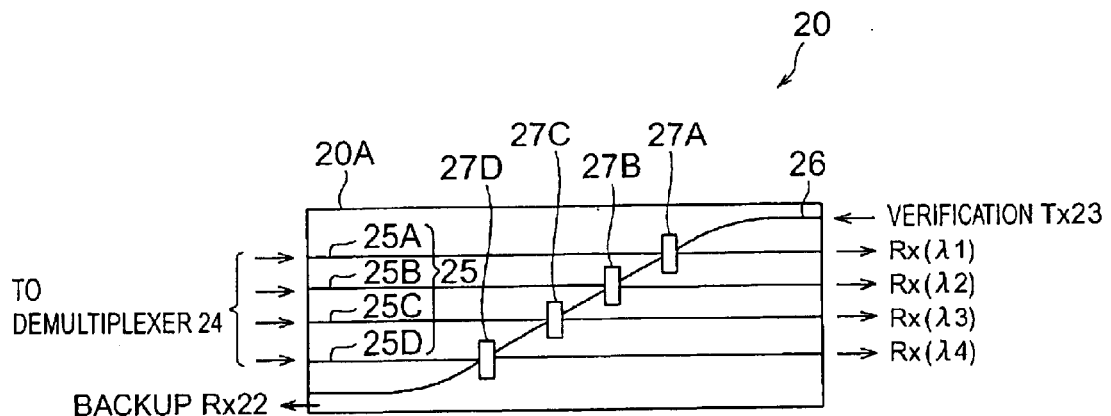
FIG. 4 shows a diagram of an optical switch on the demultiplexer side.

FIG. 4 shows a diagram of the optical switch 20 on the demultiplexer 24 side. As shown in this drawing, the optical switch 20 is provided with a planar waveguide 20A, whereas the planar waveguide 20A is formed with four parallel main waveguides 25A, 25B, 25C, 25D for inputting signal light components from the demultiplexer 24 and guiding them to their corresponding light receivers 21; and a backup waveguide 26, disposed so as to intersect the main waveguides 25 obliquely, for guiding a verification optical component from the verification light emitter 23 to the backup light receiver 22. In FIG. 4, the light receivers 21A, 21B, 21C, and 21D receiving signal light components having wavelengths $\lambda 1, \lambda 2, \lambda 3$, and $\lambda 4$ are referred to as Rx($\lambda 1$), Rx($\lambda 2$), Rx($\lambda 3$), and Rx($\lambda 4$), respectively (as in FIGS. 10A, 10B and 10C which will be explained later).

In this planar waveguide 20A, mirrors 27A, 27B, 27C, 27D are disposed at intersections between the backup waveguide 26 and individual main waveguides 25, respectively, so as to be insertable therein and retractable therefrom. The arrangement of each mirror is similar to that of the mirror 17A in the above-mentioned optical switch 10. Therefore, the mirror 27A, for example, reflects the signal light from the demultiplexer 24 toward the backup light receiver 22 while in the state inserted in the intersection as in FIG. 5B. The same holds for the mirrors 27B, 27C, 27D.

The optical switch 20 is also provided with a driving section 60 for each mirror for inserting each mirror into its corresponding intersection and retracting it therefrom (see FIGS. 6 and 7). The configuration of the driving section 60 will not be explained since it is similar to that of the driving section 60 in the above-mentioned optical switch 10.

[Operation of Optical Switch 10 on Multiplexer 14 Side]

Figure 8A:
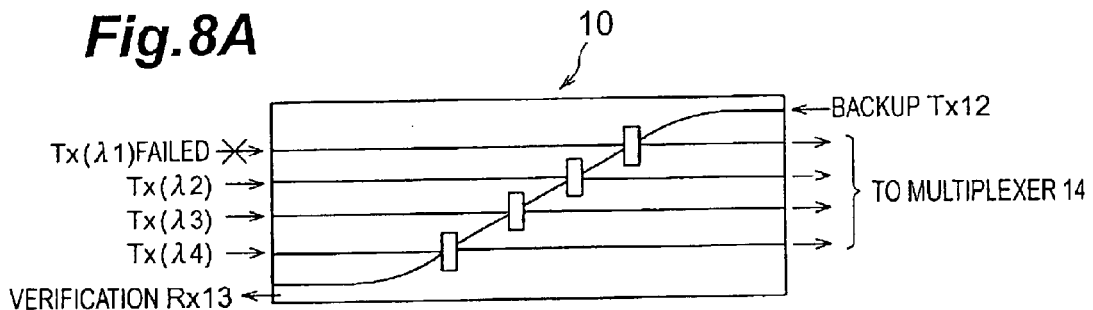
Figure 8B:
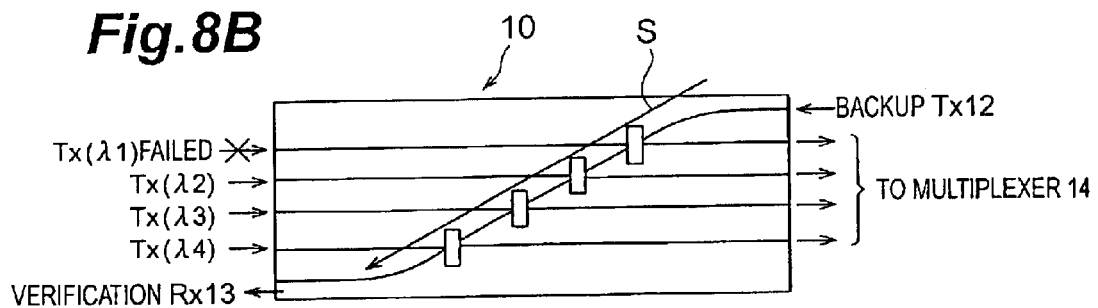
Figure 8C:
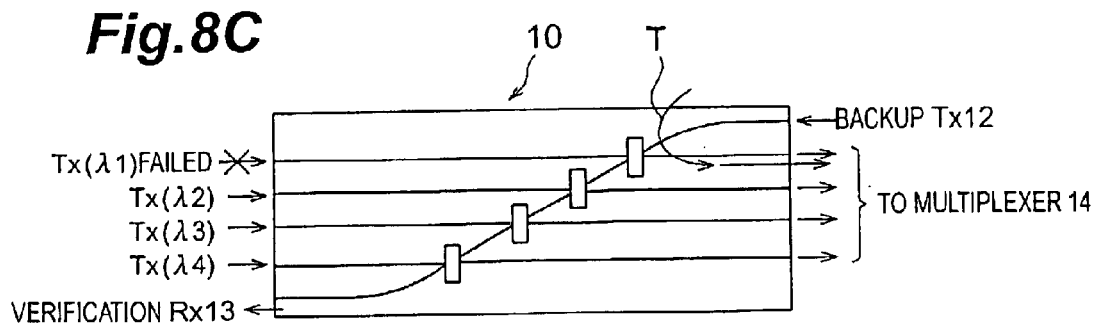
Figure 9:
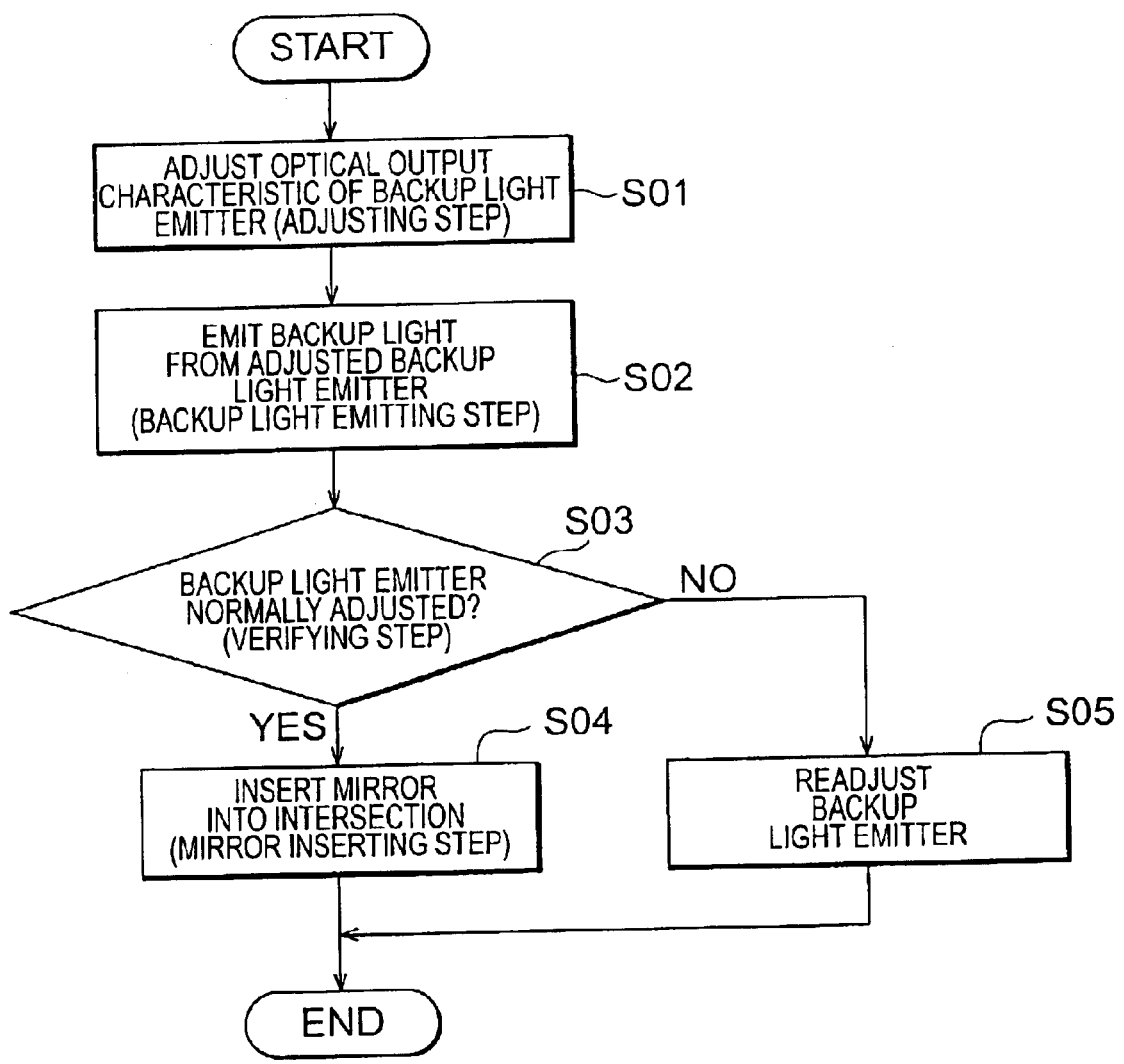
FIG. 9 show a flowchart showing processes concerning the optical switch on the multiplexer side.

With reference to FIGS. 8 and 9, an operation of the optical switch 10 on the multiplexer 14 side in accordance with the light emitter switching method of the present invention will now be explained. Here, assuming that the light emitter 11A (referred to as Tx($\lambda 1$) in the drawing) in the light emitters 11 failed as shown in FIG. 8A, the operation for switching from thus failed light emitter 11A to the backup light emitter 12 will be explained. Though the flowchart of FIG. 9 illustrates a flow of processes related to the operation of the optical switch 10, it does not indicate that all these processes are automatically executed by a controller or the like.

First, at S01 in FIG. 9, the optical output characteristic of the backup light emitter 12 is adjusted such that the backup light emitter 12 replaces the failed light emitter 11A (i.e., outputs a signal light component having the wavelength $\lambda 1$).

Then, at S02, a backup light component is emitted from thus adjusted backup light emitter 12 toward the verification light receiver 13 in the direction of arrow S in FIG. 8B.

At S03 subsequent thereto, the backup light component is received by the verification light receiver 13, and it is verified whether the backup light emitter 12 is adjusted normally or not according to data of thus received light. If the result verifying that the backup light emitter is adjusted normally is not obtained here, a process for readjusting the backup light emitter 12 or the like is carried out at S05.

If the result verifying that the backup light emitter is adjusted normally is obtained at S03, the driving section 60 inserts the mirror 17A into the intersection between the main waveguide 15A corresponding to the failed light emitter 11A and the backup waveguide 16 at S04. As a consequence, the backup light component is reflected by the mirror 17A as indicated by the arrow T in FIG. 8C, so as to be guided to the main waveguide 15A. Thus, the backup light emitter 12 can replace the failed light emitter 11A.

Namely, instead of the conventional combination of a plurality of switches, the single optical switch 10 can switch from the failed light emitter 11A to the backup light emitter 12, whereby the failure probability can be made lower than the conventional one, so as to reduce the transmission loss, and the size can further be decreased. Also, the backup light emitter 12 having yielded the result verifying that it is normally adjusted replaces the failed light emitter 11A, whereby the reliability of backup functions can be improved.

[Operation of Optical Switch 20 on Demultiplexer 24 Side]

Figure 10A:
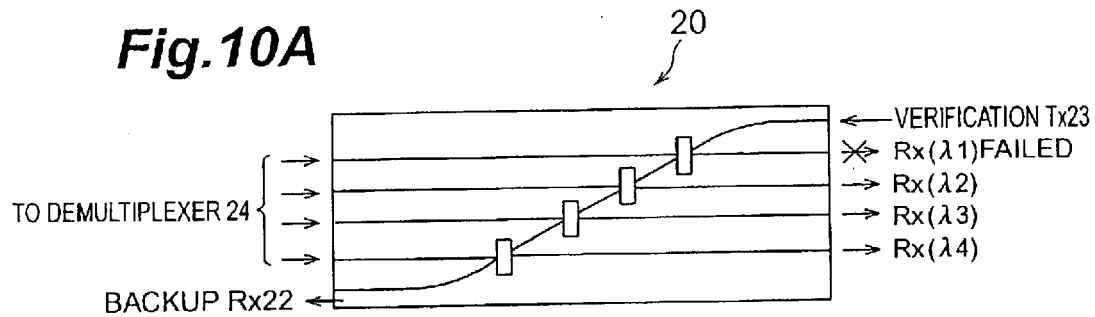
Figure 10B:
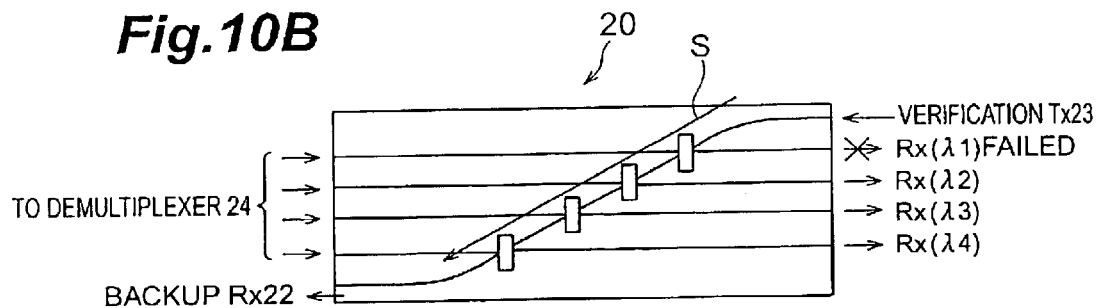
Figure 10C:
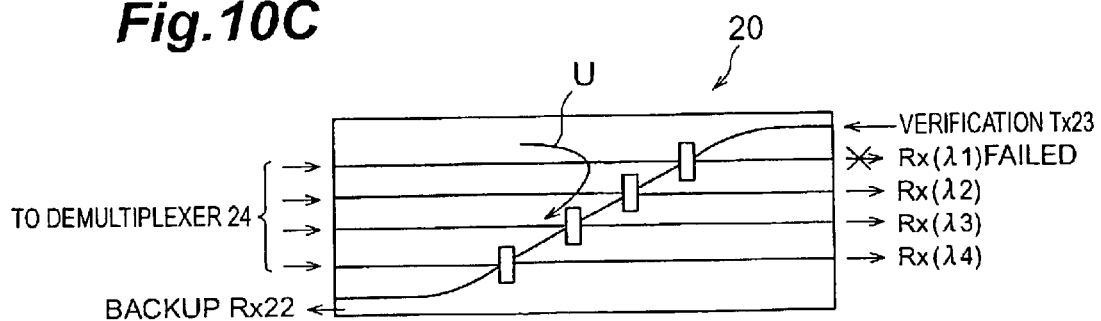
Figure 11:
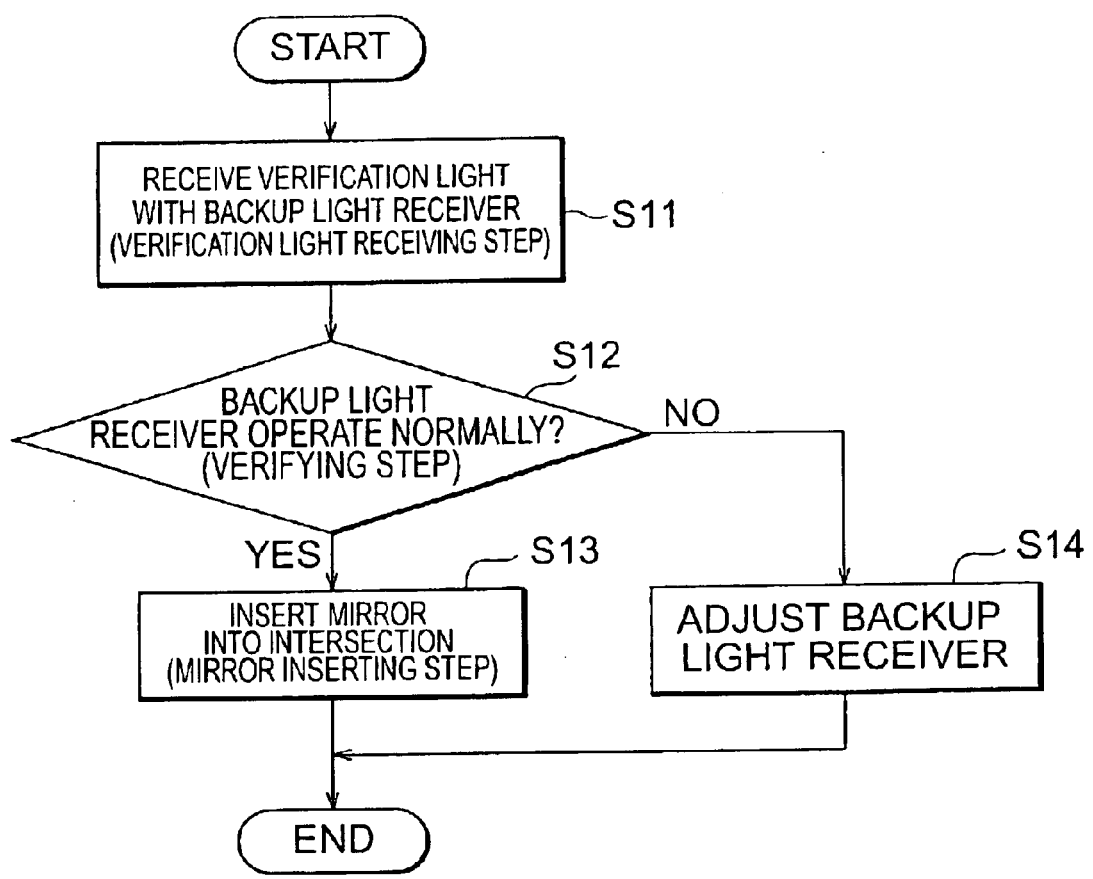
FIG. 11 shows a flowchart showing processes concerning the optical switch on the demultiplexer side.

With reference to FIGS. 10 and 11, an operation of the optical switch 20 on the demultiplexer 24 side in accordance with the light receiver switching method of the present invention will now be explained. Here, assuming that the light receiver 21A (referred to as Rx($\lambda$1) in the drawing) in the light receivers 21 failed as shown in FIG. 10A, the operation for switching from thus failed light receiver 21A to the backup light receiver 22 will be explained. Though the flowchart of FIG. 11 illustrates a flow of processes related to the operation of the optical switch 20, it does not indicate that all these processes are automatically executed by a controller or the like.

First, at S11 in FIG. 11, a verification light component is emitted from the verification light emitter 23 toward the backup light receiver 22 in the direction of arrow S in FIG. 10B, so that the backup light receiver 22 receives the verification light component.

Next, according to data of verification light received by the backup light receiver 22, it is determined at S12 whether the backup light receiver 22 operates normally or not. If the result verifying that the backup light receiver 22 operates normally is not obtained here, a process for readjusting the backup light receiver 22 or the like is carried out at S14.

If the result verifying that the backup light receiver 22 operates normally is obtained at S12, the driving section 60 inserts the mirror 27A into the intersection between the main waveguide 25A corresponding to the failed light receiver 21A and the backup waveguide 26 at S13. As a consequence, a demultiplexed light component having a wavelength $\lambda$1 (i.e., demultiplexed light component corresponding to the light receiver 21A) is reflected by the mirror 27A as in the arrow U of FIG. 10C, so as to be guided to the backup waveguide 26 and received by the backup light receiver 22. Thus, the backup light receiver 22 can replace the failed light receiver 21A.

Namely, instead of the conventional combination of a plurality of switches, the single optical switch 10 can switch from the failed light receiver 21A to the backup light receiver 22, whereby the failure probability can be made lower than the conventional one, so as to reduce the transmission loss, and the size can further be decreased. Also, the backup light receiver 22 having yielded the result verifying that it operates normally replaces the failed light receiver 21A, whereby the reliability of backup functions can be improved.

The optical switch 10 on the multiplexer side may be incorporated in the multiplexer 14. Namely, the multiplexer 14 can be constructed as a multiplexer equipped with the optical switch 10 of the above-mentioned embodiment as well.

Similarly, the optical switch 20 on the demultiplexer side may be incorporated in the demultiplexer 24. Namely, the demultiplexer 24 can be constructed as a multiplexer equipped with the optical switch 20 of the above-mentioned embodiment as well.

When one main light emitter fails in the present invention, as explained in the foregoing, a driving section inserts a mirror into an intersection on the main waveguide corresponding to the one main light emitter, while a backup light emitter whose optical output characteristic is adjusted so as to replace the one main light emitter emits a backup light component, so that the backup light component is reflected by the mirror and guided to the main waveguide corresponding to the one main light emitter, whereby the failed one main light emitter can be replaced by the backup light emitter. Thus, instead of the conventional combination of a plurality of switches, a single switch can switch from main light emitters to the backup light emitter, whereby the failure probability can be made lower than the conventional one, so as to reduce the transmission loss, and the size can further be decreased.

When one main light receiver fails, on the other hand, a driving section inserts a mirror into the intersection on the main waveguide corresponding to the one main light receiver, so that the demultiplexed light component corresponding to the one main light receiver is reflected by the mirror and guided to the backup waveguide, so as to be received by the backup light receiver, whereby the failed one main light receiver can be replaced by the backup light receiver. Thus, instead of the conventional combination of a plurality of switches, a single switch can switch from main light receivers to the backup light receiver, whereby the failure probability can be made lower than the conventional one, so as to reduce the transmission loss, and the size can further be decreased.

The basic Japanese Application No. 2002-264529 filed on Sep. 10, 2002 is hereby incorporated by reference.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An optical switch for switching between a plurality of main light emitters respectively emitting light components having wavelengths different from each other and a backup light emitter adapted to replace any of said main light emitters;

said optical switch comprising:

a base member formed with a plurality of main waveguides for respectively inputting main light components from said main light emitters and guiding said main light components to a multiplexer; and a backup waveguide, disposed so as to intersect said main waveguides obliquely, for introducing a backup light component from said backup light emitter from the downstream side to upstream side in the advancing direction of said main light components, wherein said backup waveguide comprises a single backup waveguide provided for said plurality of main waveguides and said common backup waveguide crosses said plurality of main waveguides;

a plurality of mirrors, disposed so as to be insertable into and retractable from respective intersections between said backup waveguide and said main waveguides, for blocking said main light components from said main light emitters and reflecting said backup light component from said backup light emitter toward said multiplexer when inserted; and a plurality of driving sections for the respective mirrors for inserting said mirrors into and retracting said mirrors from said intersections;

wherein said base member is further formed with a verification waveguide for picking up at least a part of backup light from said backup light emitter.

2. An optical switch according to claim 1, wherein said base member is further formed with a verification waveguide for guiding said backup light component from said backup light emitter to a verification light receiver for verifying said backup light emitter when all said mirrors are retracted from said intersections.

3. A multiplexer comprising the optical switch according to claim 2.

4. An optical communication system comprising the optical switch according to claim 2.

5. An optical switch according to claim 2, wherein each said driving section comprises:

mirror supporting means including a cantilever facing to an upper face of said base member, and a first comb electrode formed on a predetermined surface of said cantilever at a predetermined position, said mirror being placed at a predetermined position of said cantilever near a free end thereof such that said mirror is inserted into or retracted from said intersection;

a second comb electrode, facing to said upper face of said base member so as to oppose said first comb electrode, having teeth alternately inserted between teeth of said first comb electrode; and electrostatic force generating means for generating an electrostatic force between said first and second comb electrodes by applying a predetermined voltage between said first and second comb electrodes;

said electrostatic force generating means generating said electrostatic force so as to drive said first comb electrode toward or away from said second comb electrode, thereby inserting said mirror into or retracting said mirror from said intersection.

6. A multiplexer comprising the optical switch according to claim 1.

7. An optical communication system comprising the optical switch according to claim 1.

8. An optical switch according to claim 1, further comprising a single backup light receiver optically coupled with the common backup waveguide.

9. An optical switch according to claim 1, wherein said verification waveguide guides a backup light from said backup light emitter to a verification light receiver for verifying said backup light emitter when all said mirrors are refracted from said intersections.

10. An optical switch according to claim 9, wherein each said driving section comprises:

mirror supporting means including a cantilever facing to an upper face of said base member, and a first comb electrode formed on a predetermined surface of said cantilever at a predetermined position, said mirror being placed at a predetermined position of said cantilever near a free end thereof such that said mirror is inserted into or retracted from said intersection;

a second comb electrode, facing to said upper face of said base member so as to oppose said first comb electrode, having teeth alternately inserted between teeth of said first comb electrode; and electrostatic force generating means for generating an electrostatic force between said first and second comb electrodes by applying a predetermined voltage between said first and second comb electrodes;

said electrostatic force generating means generating said electrostatic force so as to drive said first comb electrode toward or away from said second comb electrode, thereby inserting said mirror into or retracting said mirror from said intersection.

11. An optical switch according to claim 1, wherein each said driving section comprises:

mirror supporting means including a cantilever facing to an upper face of said base member, and a first comb electrode formed on a predetermined surface of said cantilever at a predetermined position, said mirror being placed at a predetermined position of said cantilever near a free end thereof such that said mirror is inserted into or retracted from said intersection;

a second comb electrode, facing to said upper face of said base member so as to oppose said first comb electrode, having teeth alternately inserted between teeth of said first comb electrode; and electrostatic force generating means for generating an electrostatic force between said first and second comb electrodes by applying a predetermined voltage between said first and second comb electrodes;

said electrostatic force generating means generating said electrostatic force so as to drive said first comb electrode toward or away from said second comb electrode, thereby inserting said mirror into or retracting said mirror from said intersection.

12. An optical switch for switching between a plurality of main light receivers respectively receiving light components having wavelengths different from each other and a backup light receiver adapted to replace any of said main light receivers;

said optical switch comprising:

a base member formed with a plurality of main waveguides for respectively inputting demultiplexed light components demultiplexed by a demultiplexer directed to said main light receivers and guiding said demultiplexed light components to said main light receivers; and a backup waveguide, disposed so as to intersect said main waveguides obliquely, extending from the downstream side to upstream side in the advancing direction of said demultiplexed light components so as to terminate at said backup light receiver, wherein said backup waveguide comprises a single backup waveguide provided for said plurality of main waveguides and said common backup waveguide crosses said plurality of main waveguides;

a plurality of mirrors, disposed so as to be insertable into and retractable from respective intersections between said backup waveguide and said main waveguides, for reflecting said demultiplexed light components from said demultiplexer toward said backup light receiver when inserted; and a plurality of driving sections for the respective mirrors for inserting said mirrors into and retracting said mirrors from said intersections;

wherein said base member is further formed with a verification waveguide optically coupled to said backup light receiver.

13. An optical switch according to claim 12, wherein said base member is further formed with a verification waveguide for guiding a light component from a verification light emitter for verifying said backup light receiver into said backup light receiver when all the mirrors are retracted from said intersections.

14. A demultiplexer comprising the optical switch according to claim 13.

15. An optical communication system comprising the optical switch according to claim 13.

16. An optical switch according to claim 13, wherein each said driving section comprises:

mirror supporting means including a cantilever facing to an upper face of said base member, and a first comb electrode formed on a predetermined surface of said cantilever at a predetermined position, said mirror being placed at a predetermined position of said cantilever near a free end thereof such that said mirror is inserted into or retracted form said intersection;

a second comb electrode, facing to said upper face of said base member so as to oppose said first comb electrode, having teeth alternately inserted between teeth of said first comb electrode; and electrostatic force generating means for generating an electrostatic force between said first and second comb electrodes by applying a predetermined voltage between said first and second comb electrodes;

said electrostatic force generating means generating said electrostatic force so as to drive said first comb electrode toward or away from said second comb electrode, thereby inserting said mirror into or retracting said minor from said intersection.

17. A demultiplexer comprising the optical switch according to claim 12.

18. An optical communication system comprising the optical switch according to claim 12.

19. An optical switch according to claim 12, wherein said verification waveguide guides a backup light from a backup light emitter to a verification light receiver for verifying said backup light emitter when all said mirrors are retracted from said intersections.

20. An optical switch according to claim 19, wherein each said driving section comprises:

mirror supporting means including a cantilever facing to an upper face of said base member, and a first comb electrode formed on a predetermined surface of said cantilever at a predetermined position, said mirror being placed at a predetermined position of said cantilever near a free end thereof such that said mirror is inserted into or retracted from said intersection;

a second comb electrode, facing to said upper face of said base member so as to oppose said first comb electrode, having teeth alternately inserted between teeth of said first comb electrode; and electrostatic force generating means for generating an electrostatic force between said first and second comb electrodes by applying a predetermined voltage between said first and second comb electrodes;

said electrostatic force generating means generating said electrostatic force so as to drive said first comb electrode toward or away from said second comb electrode, thereby inserting said mirror into or retracting said mirror from said intersection.

21. An optical switch according to claim 12, wherein each said driving section comprises:

mirror supporting means including a cantilever facing to an upper face of said base member, and a first comb electrode formed on a predetermined surface of said cantilever at a predetermined position, said mirror being placed at a predetermined position of said cantilever near a free end thereof such that said mirror is inserted into or retracted from said intersection;

a second comb electrode, facing to said upper face of said base member so as to oppose said first comb electrode, having teeth alternately inserted between teeth of said first comb electrode; and electrostatic force generating means for generating an electrostatic force between said first and second comb electrodes by applying a predetermined voltage between said first and second comb electrodes;

said electrostatic force generating means generating said electrostatic force so as to drive said first comb electrode toward or away from said second comb electrode, thereby inserting said mirror into or retracting said mirror from said intersection.

22. An optical switch according to any one of claims 2, 13, 1, and 12, wherein said driving section comprises:

mirror supporting means including a cantilever disposed on an upper face of said base member, and a first comb electrode formed on a predetermined surface of said cantilever at a predetermined position, said mirror being placed at a predetermined position of said cantilever near a free end thereof such that said mirror is inserted into or retracted from said intersection;

a second comb electrode, placed on said upper face of said base member so as to oppose said first comb electrode, having teeth alternately inserted between teeth of said first comb electrode; and electrostatic force generating means for generating an electrostatic force between said first and second comb electrodes by applying a predetermined voltage between said first and second comb electrodes;

said electrostatic force generating means generating said electrostatic force so as to drive said first comb electrode toward or away from said second comb electrode, thereby inserting said mirror into or retracting said mirror from said intersection.

23. An optical communication system comprising the optical switch according to claim 22.

24. A light emitter switching method for switching from one failed main light emitter to a backup light emitter by using an optical switch comprising a base member formed with a plurality of main waveguides for respectively inputting main light components from said main light emitters and guiding said main light components to a multiplexer; and a backup waveguide, disposed so as to intersect said main waveguides obliquely, for introducing a backup light component from said backup light emitter from the downstream side to upstream side in the advancing direction of said main light components, wherein said backup waveguide comprises a single backup waveguide provided for said plurality of main waveguides and said common backup waveguide crosses said plurality of main waveguides;

a plurality of mirrors, disposed so as to be insertable into and retractable from respective intersections between said backup waveguide and said main waveguides, for blocking said main light components from said main light emitters and reflecting said backup light component from said backup light emitter toward said multiplexer when inserted; and a plurality of driving sections for the respective mirrors for inserting said mirrors into and retracting said mirrors from said intersections;

said method comprising:

an adjusting step of adjusting an optical output characteristic of said backup light emitter such that said backup light emitter replaces said one main light emitter;

a backup light emitting step of emitting a backup light component from said backup light emitter adjusted in said adjusting step;

a verifying step of receiving said backup light component with a verification light receiver and verifying whether said backup light emitter is adjusted normally or not according to data of thus received light; and a mirror inserting step of causing said driving section to insert a mirror into the intersection between the main waveguide corresponding to said one main light emitter and said backup waveguide when a result verifying that said backup light emitter is adjusted normally is obtained.

25. A light receiver switching method for switching from one failed main light receiver to a backup light receiver by using an optical switch comprising a base member formed with a plurality of main waveguides for respectively inputting main light components from a plurality of main light emitters and guiding said main light components to a multiplexer; and a backup waveguide, disposed so as to intersect said main waveguides obliquely, for introducing a backup light component from said backup light emitter from the downstream side to upstream side in the advancing direction of said main light components, wherein said backup waveguide comprises a single backup waveguide provided for said plurality of main waveguides and said common backup waveguide crosses said plurality of main waveguides;

a plurality of mirrors, disposed so as to be insertable into and retractable from respective intersections between said backup waveguide and said main waveguides, for blocking said main light components from said main light emitters and reflecting said backup light component from said backup light emitter toward said multiplexer when inserted; and a plurality of driving sections for the respective mirrors for inserting said mirrors into and retracting said mirrors from said intersections;

said method comprising:

a verification light receiving step of emitting a verification light component said a verification light emitter toward said backup light receiver and receiving said verification light component with said backup light receiver;

a verifying step of verifying whether said backup light receiver operates normally or not according to data of verification light received by said backup light receiver; and a mirror inserting step of causing said driving section to insert a mirror into the intersection between the main waveguide corresponding to said one main light receiver and said backup waveguide when a result verifying that said backup light receiver operates normally is obtained.

\* \* \* \* \*